Patented Aug. 16, 1932

1,872,452

UNITED STATES PATENT OFFICE

WILHELM HIRSCHKIND, OF PITTSBURG, CALIFORNIA, ASSIGNOR TO GREAT WESTERN ELECTRO-CHEMICAL COMPANY, OF SAN FRANCISCO, CALIFORNIA, A CORPORATION OF CALIFORNIA

PROCESS FOR MANUFACTURING ALKALI METAL XANTHATES

No Drawing.  Application filed March 19, 1925. Serial No. 16,824.

My invention relates to what I term the cyclic process for the manufacture of alkali metal xanthates.

Alkali metal xanthates, such as sodium or potassium xanthate, have hitherto been produced by following either the aqueous or alcoholic method. In the former the necessary amount of sodium or potassium hydroxide is first dissoved in water, and to this solution is added the requisite amount of carbon bisulphide and alcohol. The resultant xanthate, being highly soluble in water, a considerable mother liquor loss is sustained. In the alcoholic method the necessary amount of sodium or potassium hydroxide is first dissolved in alcohol. The quantity of alcohol necessary to make this solution is about three times the equivalent amount for the xanthate reaction. To this alcoholic solution is next added the equivalent amount of carbon bisulphide. A portion of the resultant xanthate is dissolved by the excess of alcohol present. Xanthates are less soluble in alcohol than water but even so there is still a great loss in mother liquor. The maximum yield of crystals obtainable by the aqueous method is about 60%, and with the alcoholic method about 70%, but the higher yield by the latter method is obtained at the expense of a large excess of alcohol. Attempts have been made to increase yields by recovering xanthate from the mother liquors by evaporation, but the xanthates recovered by this procedure are, generally speaking, of inferior quality.

More specifically the object of this invention is to obtain higher yields than are possible by hitherto known methods, and at the same time produce a high grade uniform product. The following is a description of my preferred method of making potassium xanthate, but it will be obvious to those skilled in the art that departures may be made from the exact procedure specified without in any way departing from the spirit of my invention.

A certain amount of potassium hydroxide is placed in an autoclave, and there is added the equivalent amount of alcohol to form alcoholate. At atmospheric temperatures and pressures this quantity of alcohol will not dissolve the quantity of potassium hydroxide present, but by closing the autoclave and bringing the material to a temperature of 100 to 120 degrees C., and a corresponding pressure, a liquid will be formed consisting of potassium alcoholate, water, alcohol and potassium hydroxide. On cooling, this solution will partially crystallize, but not to such an extent as to interfere with easy handling at room temperatures and atmospheric pressures.

After cooling there is added to this potassium hydroxide alcohol mash, the amount of saturated aqueous or alcoholic solution of potassium xanthate which experience has shown to be necessary to maintain proper fluidity when the entire amount of potassium alcoholate present has been converted to potassium xanthate by the addition of carbon bisulphide.

This amount of potassium xanthate solution having been added, the proportionate quantity of carbon bisulphide is now slowly added with constant agitation and cooling. After the reaction is complete the potassium xanthate crystals are free from the potassium xanthate solution and the crystals may be dried by any suitable standard means.

The potassium xanthate solution removed will be in quantity the amount added, plus the quantity of potassium xanthate solution formed by the water of reaction. This additional potassium xanthate solution is discarded and the original amount again used for dilution of potassium alcoholate mash. The discard of this excess potassium xanthate solution also provides means for the removal of impurities which would otherwise accumulate and ultimately result in formation of impure xanthate crystals. Thus the process will be seen to be cyclic.

In the manufacture of sodium xanthate the same general procedure is followed, but since sodium xanthate crystallizes with two molecules of water while only one molecule is formed in the reaction, it is necessary to add sufficient water to make up the equivalent of one molecule of water in the autoclave to provide the proper amount for crystallization. At the same time there is added such an amount of water as may be determined to be requisite for the prevention of accumulation of impurities in the cyclic xanthate solution. The addition of this amount of water also has the effect of making the sodium alcoholate mash, which would otherwise be too stiff to handle easily at room temperatures and pressures, fluid enough to handle.

I have also found that for cyclic xanthate solution I can substitute inert fluids such as kerosene, benzol, toluol or similar liquids.

With the above general description in mind the following concrete examples are given.

For the manufacture of potassium xanthate I mix in the autoclave 63.6 lbs. of 88% caustic potash with 51 lbs. of denatured alcohol, 182 proof, and heat to about 120° C., at which temperature and corresponding pressure the mass is completely liquid. The mass is now discharged into a cooling tank, where it is reduced to ordinary temperature and pressure and hereafter referred to as an alcoholic alkali mash. This alcoholic alkali mash is, so far as this specification is concerned, a mash of alcohol and an alkali metal hydroxide in the ratio of one mol of alcohol to each mol of alkali metal hydroxide—due allowance however being made for the purity of each ingredient used. The cooled mash, weighing 114.6 lbs. is now transferred to a reaction kettle provided with a suitable agitator and with a cooling jacket and here mixed with 150 lbs. of either alcoholic or aqueous saturated xanthate solution, or, if preferred, with this same quantity of inert liquor. After the contents of the reaction kettle have been reduced to a temperature of about 25° C., 77 lbs. of commercial carbon bisulphide are slowly added, keeping the temperature during its addition at all times below 35° C. The contents of the reaction kettle are then discharged and separated into solids and liquids by means of a centrifuge, a filter press or similar device. This separation will produce a quantity of potassium xanthate crystals which, after light drying for the purpose of removing about 8% of adhering moisture, will give 145 lbs. of potassium xanthate; about 90% of the theoretical yield.

Of the mother liquor removed in the centrifuge or filter press, amounting to 196 lbs., 40 lbs. are discarded in order to eliminate impurities from the system and the rest returned to the reaction kettle to be mixed with fresh quantities of alcoholic mash for the repetition of the process.

In producing sodium xanthate I mix in the autoclave 42 lbs. of 95% caustic soda with 51 lbs. of 182 proof denatured alcohol, and 15 lbs. of water, heat until liquid and discharge the mass into a cooling tank. The cooled mash, amounting to 108 lbs. is mixed in a reaction kettle as described above with about 150 lbs. of saturated aqueous or alcoholic solution of sodium xanthate, or with the same quantity of inert liquor, and cooled to 25° C. 77 lbs. of commercial carbon bisulphide are now run in under continuous agitation, not allowing the temperature to rise above 35° C. Upon separation of solids and liquids 175 lbs. of crystallized sodium xanthate are produced, which quantity is almost the theoretical yield.

The sodium xanthate produced contains two molecules of water of crystallization. In case an anhydrous sodium xanthate is desired these crystals are subjected to low temperature drying and the 175 lbs. of crystallized sodium xanthate will yield 140 lbs. of the anhydrous product.

Of the mother liquor amounting to about 158 lbs., 8 lbs. are discarded to eliminate impurities, after which the remaining 150 lbs. are returned to the process as above described.

If preferred the alkali alcoholate may be mixed with the cyclic liquor, in the cooler placed between the autoclave and the reaction kettle, and this cooled mixture then transferred to the reaction kettle, and the carbon bisulphide added as hereinbefore described.

Cyclic liquor is liquor which enters into the process, performs a function, is separated from the sought product, and again enters the process and so continues to enter and be removed in cycles.

I claim:

1. The process of manufacturing alkali metal xanthates comprising mixing a xanthate solution with an alcoholic alkali mash to dilute the same; adding carbon bisulphide to the mixture; and separating the solid constituents from the mother liquor.

2. The process of manufacturing alkali metal xanthates which comprises preparing a mash by mixing under heat and pressure an alkali with alcohol; preparing a xanthate solution; mixing the said xanthate solution with the mash to dilute the same and cooling the mixture; adding carbon bisulphide to the cooled mixture; and separating the solid constituents from the mother liquor.

3. The process of manufacturing alkali metal xanthates comprising mixing a xanthate solution with an alcoholic alkali mash to dilute the same; adding carbon bisulphide to the mixture; separating the solid constituents from the mother liquor; mixing the mother liquor with fresh alcoholic alkali mash; and repeating the process.

4. The process of manufacturing alkali metal xanthates which comprises preparing a mash by mixing under heat and pressure an alkali with alcohol; preparing a xanthate solution; mixing the said xanthate solution with the mash as a diluent and cooling the mixture; adding carbon bisulphide to the cooled mixture; separating the solid constituents from the mother liquor, mixing the mother liquor with fresh alcoholate alkali mash; and repeating the process.

5. The process of manufacturing alkali metal xanthates which comprises first making a mash of alcohol and alkali metal hydroxide; and then carrying this mash in a diluting cyclic liquor, while adding carbon bisulphide.

6. The process of manufacturing alkali metal xanthates which comprises first making a mash of alcohol and alkali metal hydroxide; and then carrying this mash in a diluting cyclic liquor, which is a solution of the xanthate being manufactured, while adding carbon bisulphide.

7. The process of manufacturing sodium xanthate which comprises first making a mash of alcohol and sodium hydroxide plus sufficient water to provide two molecules of water to crystallize with each molecule of sodium xanthate formed in the final reaction; then carrying this sodium alcoholate mash in a diluting cyclic liquor while adding carbon bisulphide.

8. The process of manufacturing alkali metal xanthates which comprises, first, making a mash of alkali metal hydroxide and alcohol and then carrying this mash in a diluting liquor while adding carbon bisulphide.

9. The process of manufacturing alkali metal xanthates which comprises first making a mash of alcohol and alkali metal hydroxide and then carrying this mash in an inert diluting cyclic liquor, while adding carbon bisulphide.

10. The process of manufacturing alkali metal xanthates which comprises first making a mash of alcohol and alkali metal hydroxide and then carrying this mash in an inert diluting cyclic liquor substantially non-solvent of xanthates being produced, while adding carbon bisulphide.

11. A method of producing alkali metal xanthates which consists in heating an alkali metal hydroxide and an alcohol in a closed system to a temperature capable of producing a pressure above atmospheric and thereafter adding carbon bisulphide to the mass while maintaining the mass at a temperature suitable for the completion of the reaction.

12. A method of producing alkali metal xanthates which consists in heating an alkali metal hydroxide and an alcohol in quantities approximately proportional to their molecular weights in a closed system to a temperature capable of producing a pressure above atmospheric, until they have reacted with each other to such an extent as to disintegrate mechanically the hydroxide, cooling the mass, adding carbon bisulfide thereto and maintaining the mass at a temperature below the decomposition point of the xanthate to be produced.

13. A method of producing alkali metal xanthates which consists in heating an alkali metal hydroxide and alcohol in quantities approximately proportional to their molecular weights in a closed system to a temperature capable of producing a pressure above atmospheric, maintaining the heat for a sufficient time to effect the mechanical breaking up of the hydroxide, cooling the mass so obtained, then adding carbon bisulfide thereto in substantially the theoretical amount necessary to produce the given quantity of alkali metal xanthate.

14. A method of producing alkali metal xanthates which consists in heating an alkali metal hydroxide in the solid state and an alcohol in quantities proportional to their molecular weights in a closed system to a temperature capable of producing a pressure above atmospheric, maintaining the heat for a sufficient time to effect a mechanical breaking up of the hydroxide, cooling the mass so obtained, then adding carbon bisulfide thereto in substantially the theoretical amount necessary to produce the given quantity of alkali metal xanthate, while cooling to maintain the temperature sufficient to complete the reaction but below the decomposition point of the xanthate.

In testimony whereof I have signed my name to this specification.

WILHELM HIRSCHKIND.